(12) United States Patent
Blasco Claret et al.

(10) Patent No.: US 8,982,909 B2
(45) Date of Patent: Mar. 17, 2015

(54) MULTI-BAND DATA TRANSMISSION

(75) Inventors: Jorge Vicente Blasco Claret, Valencia (ES); Salvador Iranzo Molinero, Betera (ES); Agustin Badenes Corella, Castellon (ES); Jose Luis Gonzalez Moreno, Xirivella (ES); Luis Manuel Torres Cantón, Valencia (ES)

(73) Assignee: Marvell Hispania, S.L., Madrid (ES)

( * ) Notice: Subject to any disclaimer, the term of this patent is extended or adjusted under 35 U.S.C. 154(b) by 1050 days.

(21) Appl. No.: 13/054,024

(22) PCT Filed: Jul. 3, 2009
(Under 37 CFR 1.47)

(86) PCT No.: PCT/ES2009/070273
§ 371 (c)(1),
(2), (4) Date: Nov. 29, 2011

(87) PCT Pub. No.: WO2010/010216
PCT Pub. Date: Jan. 28, 2010

(65) Prior Publication Data
US 2012/0134375 A1 May 31, 2012

(30) Foreign Application Priority Data

Jul. 14, 2008 (ES) .................................. 200802091

(51) Int. Cl.
*H04J 1/00* (2006.01)
*H04W 4/00* (2009.01)
*H04B 1/04* (2006.01)
*H04B 3/54* (2006.01)
*H04L 5/00* (2006.01)

(52) U.S. Cl.
CPC .......... *H04B 1/0483* (2013.01); *H04B 2203/00* (2013.01); *H04L 5/0005* (2013.01); *H04B 3/54* (2013.01); *H04B 2203/5466* (2013.01)
USPC ........................... 370/480; 370/328; 370/331

(58) Field of Classification Search
None
See application file for complete search history.

(56) References Cited

U.S. PATENT DOCUMENTS

| 6,985,715 B2 | 1/2006 | Lee |
| 7,206,367 B1 * | 4/2007 | Moore .......................... 375/354 |
| 2002/0010870 A1 | 1/2002 | Gardner |
| 2005/0113045 A1 * | 5/2005 | Santhoff et al. ............... 455/130 |

(Continued)

FOREIGN PATENT DOCUMENTS

| CN | 101091342 A | 12/2007 |
| EP | 0975097 A2 | 1/2000 |

(Continued)

OTHER PUBLICATIONS

Notification of Third Office Action Dated May 26, 2014 for Chinese Patent Application No. 200980127284.8, 6 pages.

(Continued)

*Primary Examiner* — Faruk Hamza
*Assistant Examiner* — Diane Lo (57) ABSTRACT

A system for transmitting and receiving data includes a physical adaptation block configured to separate the data into a plurality of frequency bands. Each of the frequency bands has an associated symbol time, and each of the associated symbol times is a whole multiple of one half of a smallest symbol time of all of the frequency bands. An analog front end is configured to provide the data in the plurality of frequency bands to a transmission medium.

18 Claims, 11 Drawing Sheets

(56) References Cited

U.S. PATENT DOCUMENTS

| | | | |
|---|---|---|---|
| 2006/0189335 A1* | 8/2006 | Hara et al. | 455/509 |
| 2007/0058739 A1* | 3/2007 | Aytur et al. | 375/260 |
| 2007/0254693 A1* | 11/2007 | Furukawa | 455/553.1 |
| 2007/0280160 A1* | 12/2007 | Kim et al. | 370/331 |
| 2008/0006310 A1 | 1/2008 | Munstermann et al. | |
| 2008/0232517 A1* | 9/2008 | Terabe et al. | 375/344 |
| 2012/0307917 A1 | 12/2012 | Goldhamer | |

FOREIGN PATENT DOCUMENTS

| | | |
|---|---|---|
| EP | 1388954 A2 | 2/2004 |
| EP | 1770870 A1 | 4/2007 |
| EP | 2302818 A1 | 3/2011 |
| WO | WO-2004/100392 A1 | 11/2004 |
| WO | WO-2007/039723 A1 | 4/2007 |
| WO | WO-2009/054547 A2 | 4/2009 |
| WO | WO-2010/010216 A1 | 1/2010 |
| WO | WO-2011001430 A2 | 1/2011 |

OTHER PUBLICATIONS

International Search Report mailed Aug. 14, 2014 for corresponding PCT Application No. PCT/IB2014/000743, 11 pages.

Lanoiselee et al., "Analog Front end Design for Gigabit Power Line Communication," 16th IEEE Int'l Symp. On Power Line Communications and Its Applications (ISPLC) 2012, Institute for Electrical and Electronics Engineers, 6 pages (Mar. 2012).

\* cited by examiner

MULTI-BAND DATA TRANSMISSION

CROSS-REFERENCE TO RELATED APPLICATIONS

This application is a National Stage of International Application No. PCT/ES2009/070273, filed Jul. 3, 2009 and claims the benefit of Spanish Application P200802091, filed Jul. 14, 2008. The disclosures of the above applications are incorporated herein by reference in their entirety.

FIELD

The present disclosure relates to a multi-band data transmission system and method.

BACKGROUND

In most communication systems, increasing bandwidth translates into a greater transmission capacity. However, the physical medium or communication channel usually has some characteristics that vary in frequency, and only certain fragments or frequency bands can be used. For example, in an electrical grid, the power that can be injected starting from 30 MHz may vary in comparison to the power that can be injected at frequencies lower than 30 MHz. Also, an electrical grid has other characteristics that make an electrical grid less desirable as a transmission medium. For example, in an electrical grid, the noise floor decreases with the frequency, the attenuation increases with the frequency, and there is a lot of noise in the frequency-modulation (FM) radio band (from 88.5 to 108 MHz).

Various technologies related to multiband transmission exist within the state of the art. For example, patent WO2004/100392 shows a system with several overlapping subbands whose separation is accomplished digitally by means of a bank of digital filters. The process for utilizing a higher frequency band is known in the state of the art, and such process has a number of possible implementations, like those shown in U.S. Pat. No. 6,985,715 and US2002/0010870. These patents show how to go higher in frequency in order to use another frequency band. WO2007/039723 proposes several independent and different systems that work in different frequency bands having a different physical part (PHY) and medium access part (MAC) for each band. This has the drawback that the chains of transmission and reception must be duplicated at the digital level, a high cost of the analog separation filters and a larger guard band between the different systems. In US2008/0063100, the concept of variable symbol time appears.

SUMMARY

A system for transmitting and receiving data includes a physical adaptation block configured to separate the data into a plurality of frequency bands. Each of the frequency bands has an associated symbol time, and each of the associated symbol times is a whole multiple of one half of a smallest symbol time of all of the frequency bands. An analog front end (AFE) is configured to provide the data in the plurality of frequency bands to a transmission medium.

A method for transmission of multi-band data according to the present disclosure allows the use of a greater bandwidth in the system in which it is implemented, taking advantage of various frequency bands, depending upon the channel used in the communication and synchronizing the various bands. The utilization of numerous bands results in an increase in the system's bandwidth and, consequently, the amount of information that can be transmitted, and when the bands are synchronized, digital implementation is facilitated and the specifications of the analog filters are simplified, resulting in an increase in the transmission capacity at low cost.

Although the method of the present disclosure can be used in any communication system independently of the transmission medium, it is especially useful in media that encounter noise or interference at certain frequencies, or in media where the maximum spectral density of injectable power varies with the frequency due to the standard. Such is the case with the electrical grid used as a communication channel, since the process may use bands that do not coincide with the frequencies affected by noise or interference and may adapt the properties of each band to the spectral power density that the standard allows to be injected.

In order to achieve the objectives and avoid the drawbacks indicated in previous sections, a procedure for multiband transmission of data simultaneously uses two or more transmission bands, that is, continuous frequency ranges, for transmission and reception of signals, as well as separating the different bands in reception by analog means, and also utilizes multicarrier modulation. Transmission and reception in the different bands are achieved in synchronized form. That is, all the bands transmit simultaneously and all the bands receive simultaneously. The symbol times utilized in each of the bands are whole multiples of the smallest symbol half-time of those used for the different bands. Accordingly, the digital implementation of the system is facilitated, the specifications of the different analog filters are simplified and the reuse of hardware is permitted.

Although the method can be used in communication systems on any transmission medium, the most suitable media for increasing transmission capacity are the electrical grid, coaxial cable, and twisted-pair wires. In the preferred implementation, in order to maximize gain with the method, the bands or continuous frequency ranges have a bandwidth equal to or greater than 20 MHz. The method may use, as means of conversion between time and frequency, direct discrete Fourier transforms (DFT) and inverse discrete Fourier transforms (IDFT) with the same number of points in each of the bands utilized.

A simple form of transmission in a frequency band different from the base band consists of initially generating the signal in the base band and subsequently transposing the signal in frequency until the signal is situated in the optimum band. A system that utilizes the method of the present disclosure can utilize an analog front end (or AFE) in common transmission for all bands or else different for each of them. Both realizations are possible and will depend upon the application.

For maximum optimization of the result of the method, the automatic gain control must be independent for each band utilized in such a way the gain in one band does not predispose gain in the rest of the bands. On the other hand, it is not necessary to utilize all the frequency bands in order to carry out the task of synchronizing the system with others in the network. The system synchronization that the method implements can be done using only one of the bands out of the many in the system, where the band is preferably the one located at the lowest frequency of those utilized, since, with many communication channels, this band is the one that achieves the best coverage, while having less attenuation than higher frequencies.

In order to succeed in reducing the cost of the system, it is possible to reuse the means of treatment in the domains of frequency and conversion between time and frequency, direct (DFT) and inverse (IDFT) discrete Fourier transforms for processing two or more bands. In the same way, in one implementation of the method, it is possible to reuse the means of treatment in time in processing of two or more bands or else combine the reuse of treatment media in the frequency domain, those in the time domain and those between time and frequency.

The method can also use, together with the division of the channel into periods in which the bands are used in synchrony, that is, simultaneous transmission and reception in all bands, and periods in which the bands are used independently or asynchronously so that the multiband data transmission system can share the channel with other systems that utilize the bands asynchronously. For transmission to multiple users, the method can use a different band for each user, a group of carriers for each user, or else perform a multiplexing in time for transmitting to each user.

When the multicarrier modulation is OFDM (Orthogonal Frequency Division Multiplexing) the method can apply techniques of orthogonal frequency division for multiple access (OFDMA), assigning different groups of carriers or different bands to different users. The multiband transmission method can include MIMO processing technique (multiple input, multiple output). This allows the bands to be multiplexed by division in frequency, division in space or a combination of the foregoing.

BRIEF DESCRIPTION OF DRAWINGS

The present disclosure will become more fully understood from the detailed description and the accompanying drawings, wherein.

DESCRIPTION

In order to improve communication capacity, a communication system must utilize certain bands (i.e., frequency ranges), which presupposes the inclusion of different filters for separating each band and a considerable increase in the final cost of the system. The method in this present disclosure overcomes this problem by allowing the system implementing it to be a system of reduced cost when the different frequency bands used are synchronized, which simplifies and lowers the cost of the filters and reduces the final cost of the system.

A method for transmission of multi-band data according to the present disclosure allows the use of a greater bandwidth in the system in which it is implemented, taking advantage of various frequency bands, depending upon the channel used in the communication and synchronizing the various bands.

The utilization of numerous bands results in an increase in the system's bandwidth and consequently the amount of information that can be transmitted, and when the bands are synchronized, digital implementation is facilitated and the specifications of the analog filters are simplified, resulting in the achievement of an increase in the transmission capacity at low cost.

For the different implementation examples which will be shown below, we have chosen as our communication medium a low-voltage electrical grid. This medium turns out to be hostile for most communications, due to the presence of noise and to its behavior depending on the frequency, with which the method can be used for achieving greater bandwidth and along with the greater bandwidth, a higher transmission capacity, without high costs.

Figure 1:
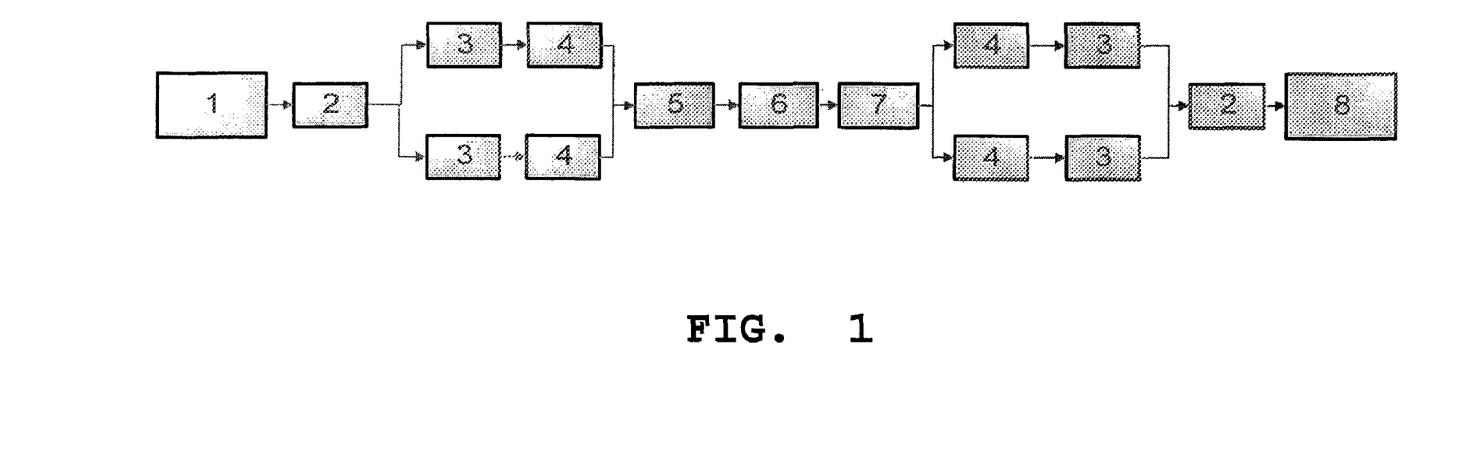
FIG. 1 shows one implementation of the method in the form of a block diagram.

FIG. 1 shows a route of data between different blocks of one example of implementation in which a system utilizing a multiband method uses exactly two bands. In the transmitter there is a data separator (1) followed by a control block for access to the medium (2). Afterward, each band is treated as separated by a physical adaptation block (3) and an analog front end (4). Finally, the signals are combined by a signal combiner block (5) and are introduced into a communication channel (6). In the receiver, the signals are obtained from the communication channel (6) and separated by a signal separator filter (7). Each band is handled by an analog front end (4) and a different physical adaptation block (3), and finally the data are made to pass a control block for access to the medium and the data are combined by a data combination block (8).

The present disclosure is directed to synchronous transmission and reception in the different bands and on the use of symbol times in each band that are multiples of one-half of the smallest symbol used in the different bands, which allows control of the access to the medium by a single access control block (2). The communication medium and the size of the different bands are irrelevant, but the best results are obtained in systems that use the electrical grid, coaxial cable, and twisted-pair cable, and using bands with a width of at least 20 MHz as the transmission medium, since in this way it is possible to avoid bands or frequency ranges with a lot of noise or interference.

When transmitting and receiving synchronously, that is, transmitting or receiving in all the bands at the same time, the specifications of the analog filters are more relaxed than if the bands were independent, since one avoids the case of having to receive a very low-power signal while transmitting a signal with much more power in an adjacent band. Also, the necessities of size of guard bands between bands are reduced, and it is possible to reuse processing blocks in transmission and reception, processing the bands serially.

Although it is possible to use equal bands in an implementation, this is not strictly necessary. It is only necessary for the symbol times of the various bands to be whole multiples of one-half the shortest time of those used in the different bands.

Figure 2:
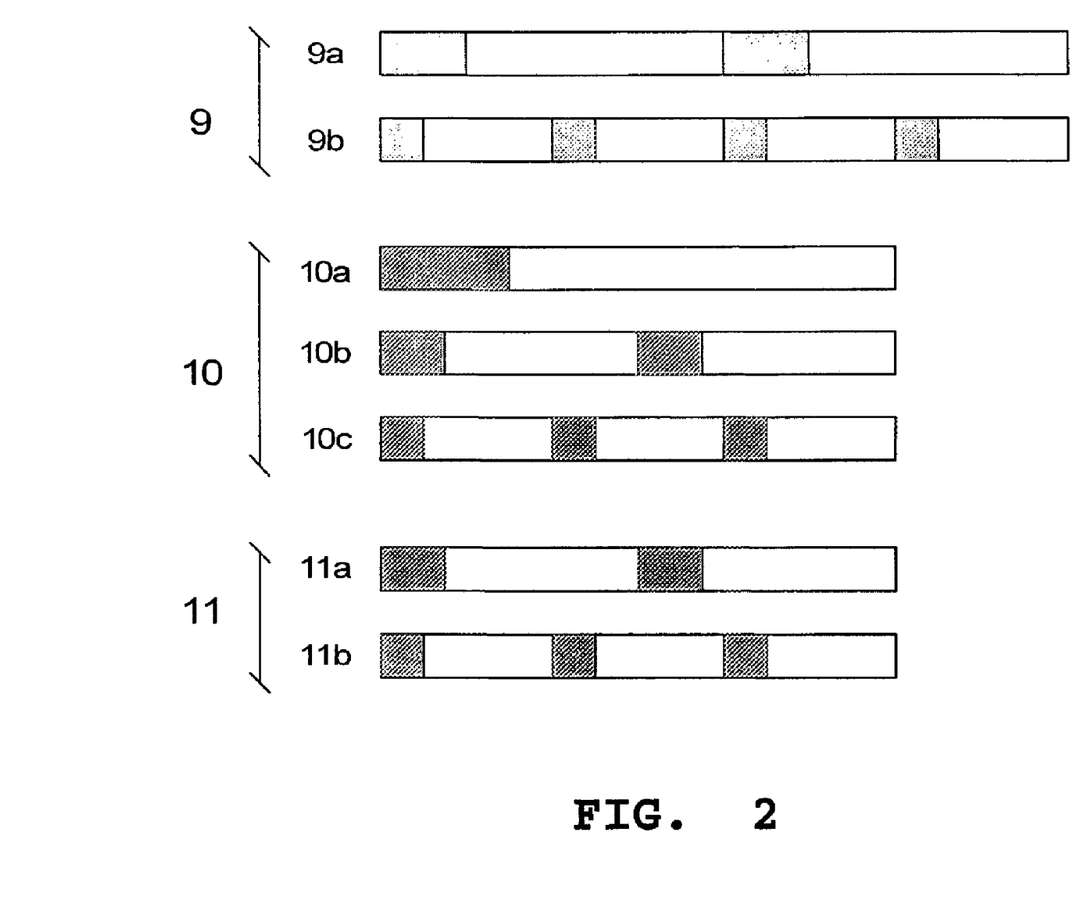
FIG. 2 shows the relation between times among several bands utilized in the method.

This can be observed in FIG. 2, where the first implementation example (9) shows the relation in a two-band system (9a, 9b), where in the time in which the lower-frequency band (9a) transmits one symbol, the higher-frequency band transmits two symbols (9b). In this example, if a rapid transform Fourier block (FFT) is used to make the translation between time and frequency, and the FFT is reused for all the bands, first the FFT will process one symbol from the lower-frequency band and then two symbols from the other band, and so on in succession, dividing the data in the same way. In the following example (10), three bands are used (10a, 10b, 10c) where in the time in which the first band (10a) transmits one symbol, the second (10b) transmits two and the third (10c) transmits three. The final example (11) uses two bands (11a, 11b) in which the relation is three times one-half of the symbol of the band that uses the smaller symbol.

Use of one size symbol or another depends on the characteristics of the communication channel. For example, in the case of a low-voltage electrical grid, it is known that a distortion is produced that is caused by the arrival at the receiver of identical signals at different times because of the existence of multiple paths (delay spread). This effect diminishes when the frequency is increased, and for this reason it would be preferable to use short symbols.

In order to achieve a more advantageous system, in another implementation example the same number of points in all the bands can be used, with the result that the means of conversion between time and frequency will have the same number of points in each of the bands, and processing in frequency will use the same structure for each of the bands. Both the means of conversion between time and frequency and processing in frequency are included in the physical adaptation blocks (3) which can be seen in FIG. 1.

Figure 3:
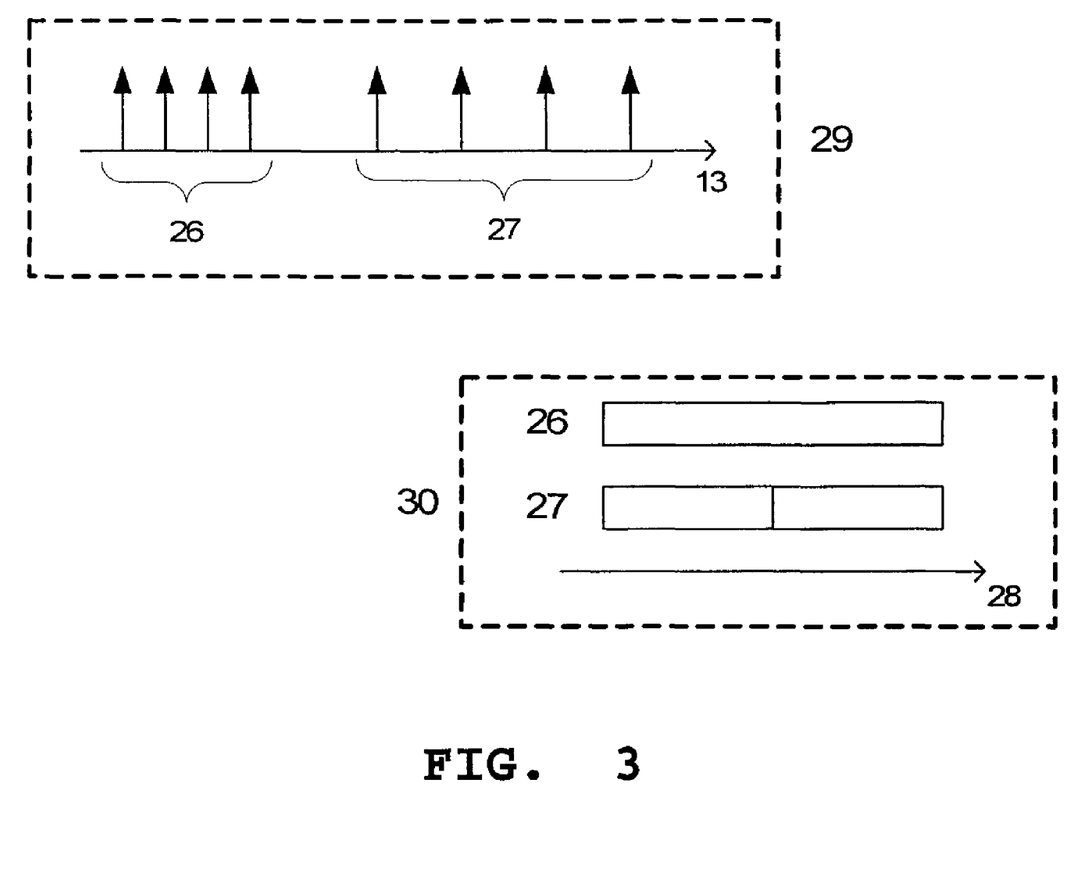
FIG. 3 shows the relation between the separation between carriers in frequency and the duration of the symbol for two bands.
Figure 4:
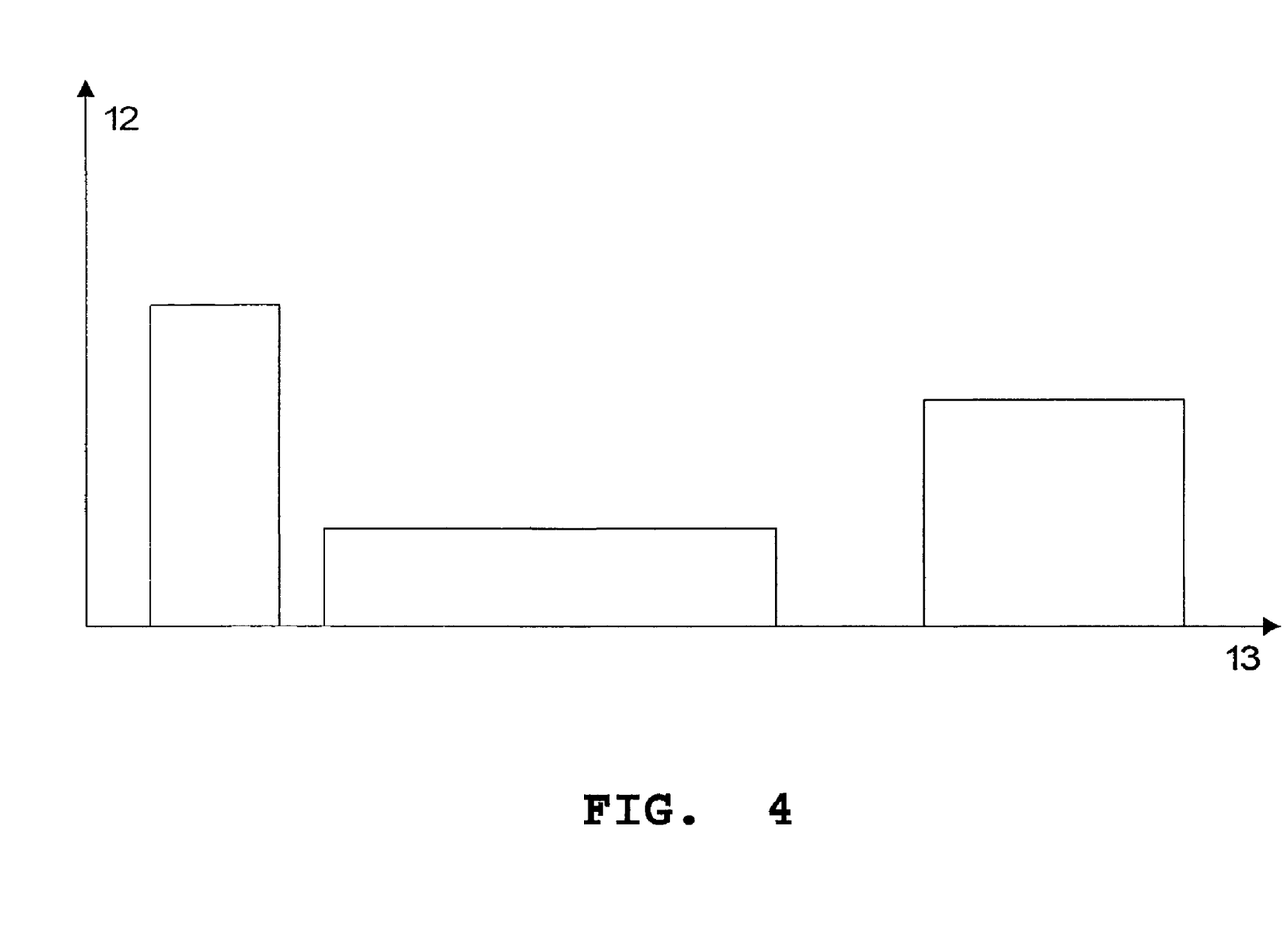
FIG. 4 shows the power injected into the different bands in an implementation on the electrical grid.
Figure 5:
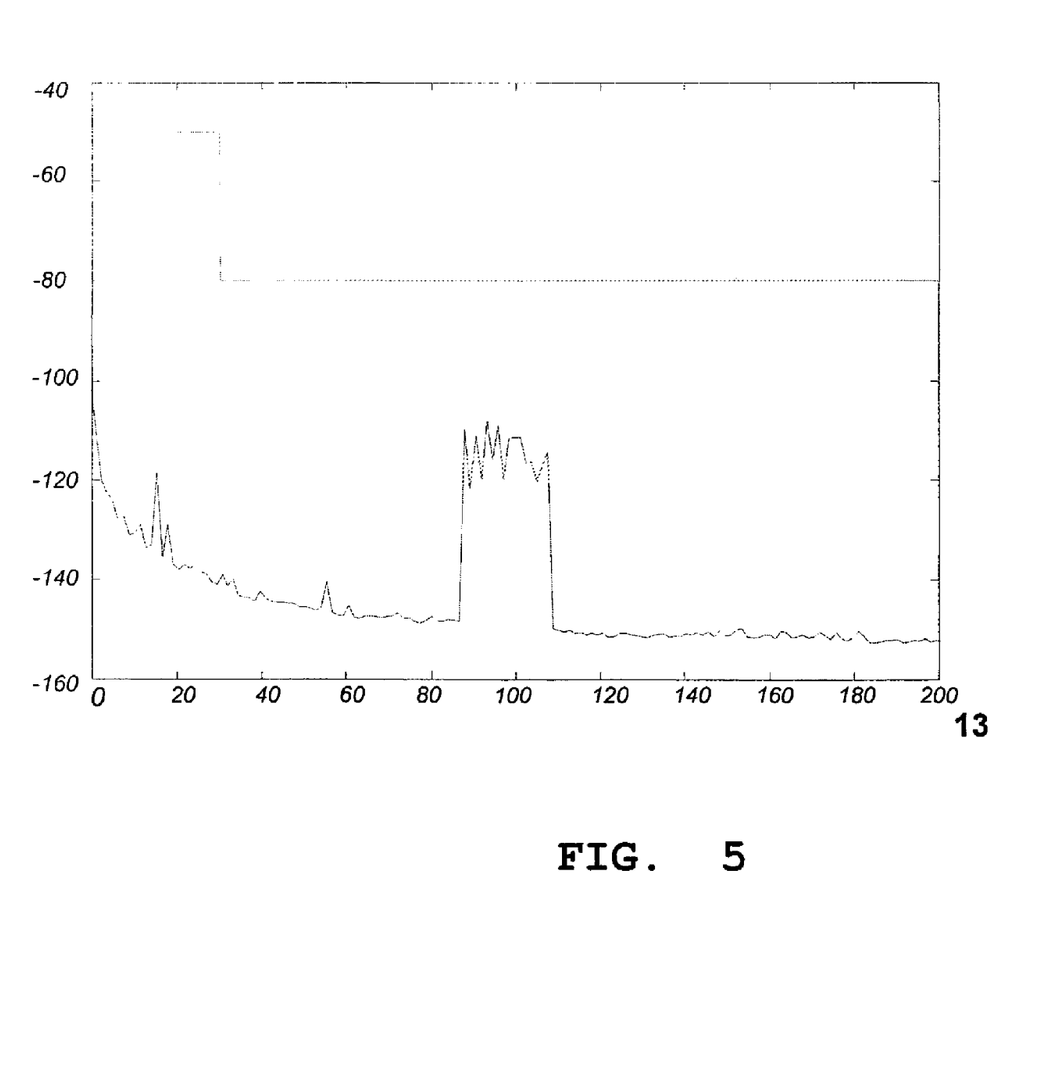
FIG. 5 shows the relation between the spectral density of the power (PSD) injected and the background noise when the electrical line is used as the communication medium.

In this case it is possible to vary the separation between carriers in such a way that the symbols generated can have longer or shorter duration. One example can be seen in FIG. 3. In FIG. 3, there is a representation in frequency (29) and another in time (30) of two bands (26) and (27) where the axes of frequency (13) and of time (28) are marked. As shown in FIG. 3, one observes that if the separation between carriers is doubled, the duration of the symbol will be one-half and the covered bandwidth would be double using the same number of carriers. Each of the points of the direct and inverse Fourier transforms (DFT/IDFT) will correspond to active or inactive carriers, which gives more flexibility when the system is adapted to the available bandwidth. The injected power in each of the bands may be different, since the existing standard must be obeyed and the calculation done keeping in mind the noise in the channel at those frequencies. FIG. 4 shows the graph of the spectral density of the injectable power in one example for an electrical grid and a system with three bands. The maximum spectral density of power of the injected signal (12) is different for each of the three bands of the system in terms of the frequency (13). FIG. 5 shows the limit of spectral density of injected power (14) and background noise (15) in terms of frequency (13). With this channel behavior, it is recommended that the range of frequencies from 0 to 200 MHz be divided into three bands: 0-30, 30-88 and 108-200 MHz. The first division is done in order to respect the limit of spectral density of injected power, while the second division is done in order to avoid the band with high noise (frequency-modulation radio band).

Figure 6:
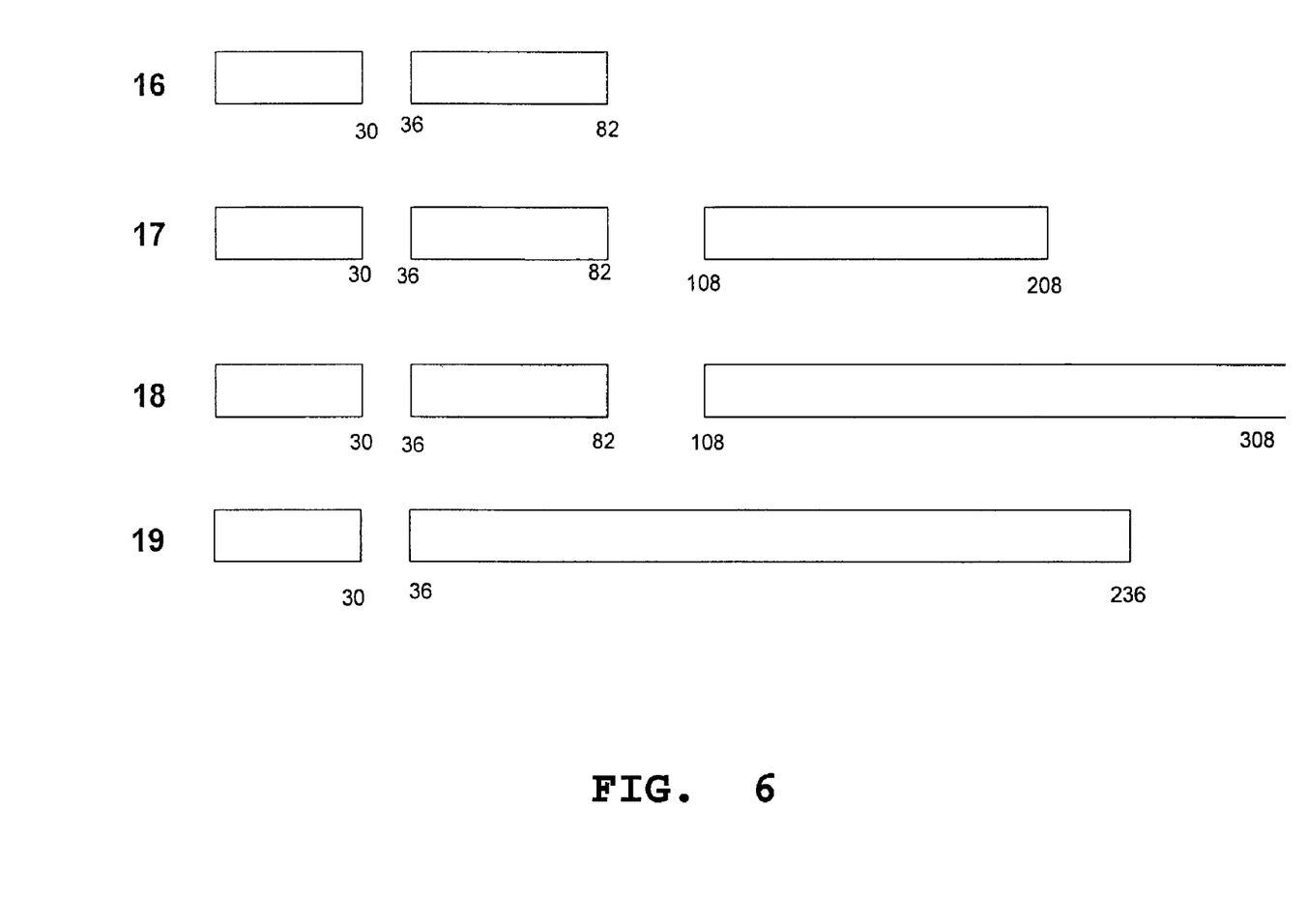
FIG. 6 shows different bands that can be used when sending communications over the electrical grid.
Figure 7:
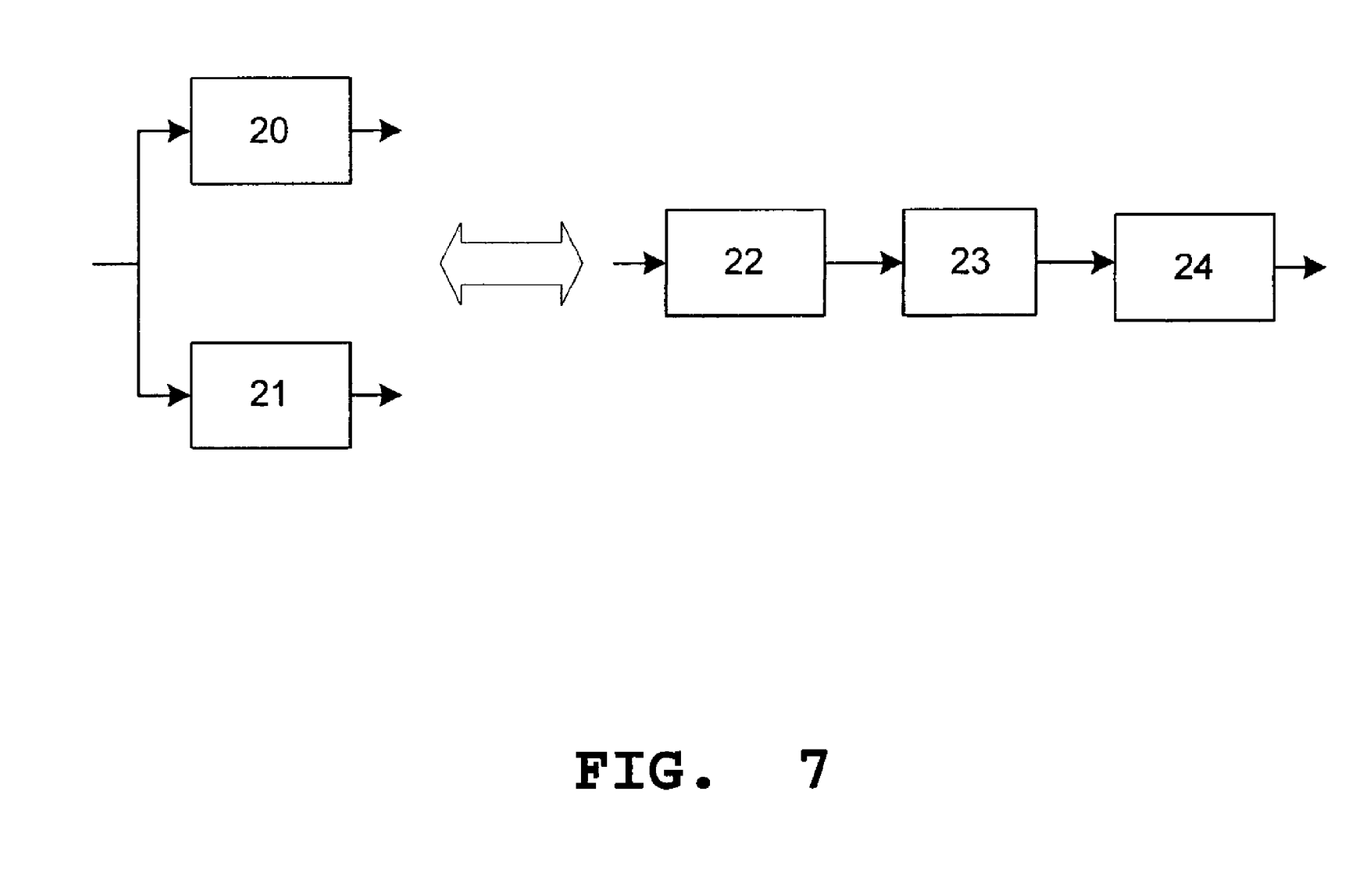
FIG. 7 shows an implementation in which treatment in the digital part of the different bands is done by processing the bands serially.
Figure 10:
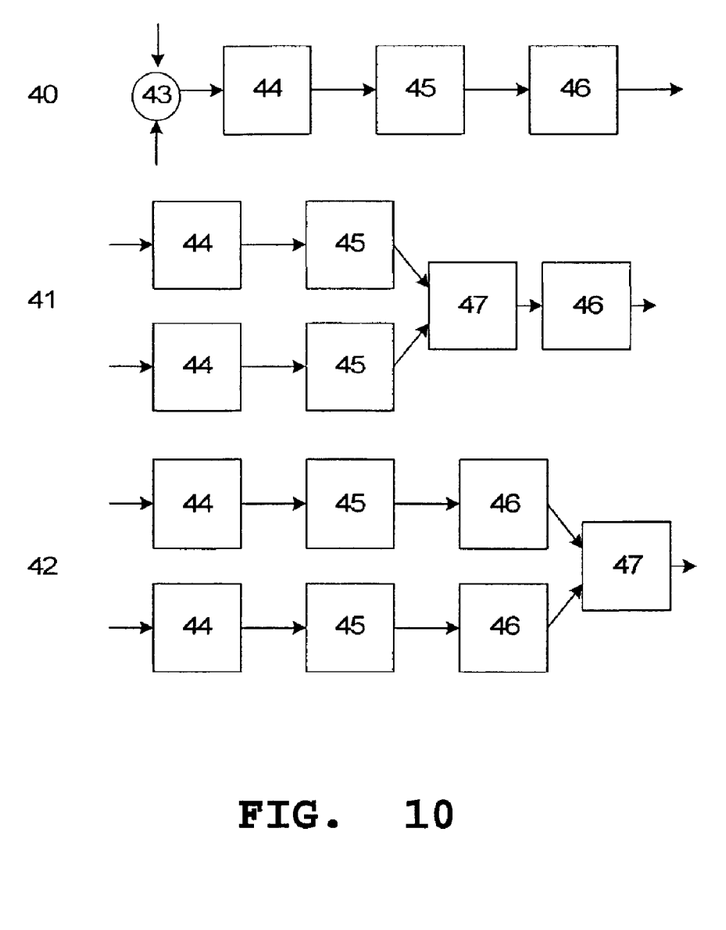
FIG. 10 shows three ways to implement the analog front end in the method of the present disclosure.

One way to generate a signal in each band is to generate the signal in the baseband and then translate the signal into the suitable frequencies. For the previous implementation example, when a FFT of 2048 points and a sampling frequency of 50 MHz for the 0-30 MHz band is used, it is possible to use the same FFT of 2048 points at 100 MHz for the 30-88 MHz band and another of the same for the 108-200 MHz band. If a guard band is included in the 30-88 MHz band, reducing its size until the band is from 36 to 82 MHz, the reduced band could be generated applying an FFT of 2048 points at 50 MHz. In FIG. 6 are shown the usable bands in different examples of implementation. The first division (16) uses two bands, one of 0 to 30 MHz and the other from 36 to 82 MHz. The second division (17) uses three bands, from 0 to 30, from 36 to 82 and from 108 to 208 MHz. The third division (17) uses three bands, from 0 to 30, from 36 to 82 and from 108 to 308 MHz. The fourth division (18) uses the bands from 0 to 30 and from 36 to 236 MHz. To reduce the implementation cost of the system, several blocks can be reused in processing the signals of the different bands. This can be seen in the implementation example in FIG. 7, which has gone beyond having one block for processing the band situated at a higher frequency (20) and one block for processing the band situated at a lower frequency (21) to having a common block (22) which processes the signals in frequency, a common block for the frequency-to-time conversion of the signals transmitted by the two bands (23) and a common block that carries out the processing in time of the transmitted signal (24). In reception, the processing is reversed. The different blocks can be reused or not, independently, that is, the processing in frequency and the frequency-to-time conversion could be done, and the processing in time of each band could be done, with independent blocks. In the method of the present disclosure, a separate processing is always done in each band in the analog part in reception (understood as analog front end—AFE—and the converters). In contrast, the analog front end (AFE) in transmission can be common for all the bands or else the analog front end can be different for each band. In case automatic gain control (AGC) is used, the control will also be independent for each band. In FIG. 10 are shown three ways of creating an analog front end (AFE) for transmission in the system by applying the method of the present disclosure. In the first implementation (40), all the bands are using a single AFE transmission chain, which implies that a digital addition (43) has been performed before the digital-to-analog converter (DAC 44), both included in the physical adaptation block (3), afterward they are filtered (5) and finally they are amplified (Line Driver 46) in the analog front end (4). In the second implementation (41) each band is separately processed with its own digital-to-analog converter (44) and its own filter (45), after which the signals are combined (47) and finally the result of the combination is amplified (46). In the third implementation (42) each band is separately processed with its own digital-to-analog converter (44), its own filter (45) and its own amplifier (46), after which the different signals are combined (47)

Figure 8:
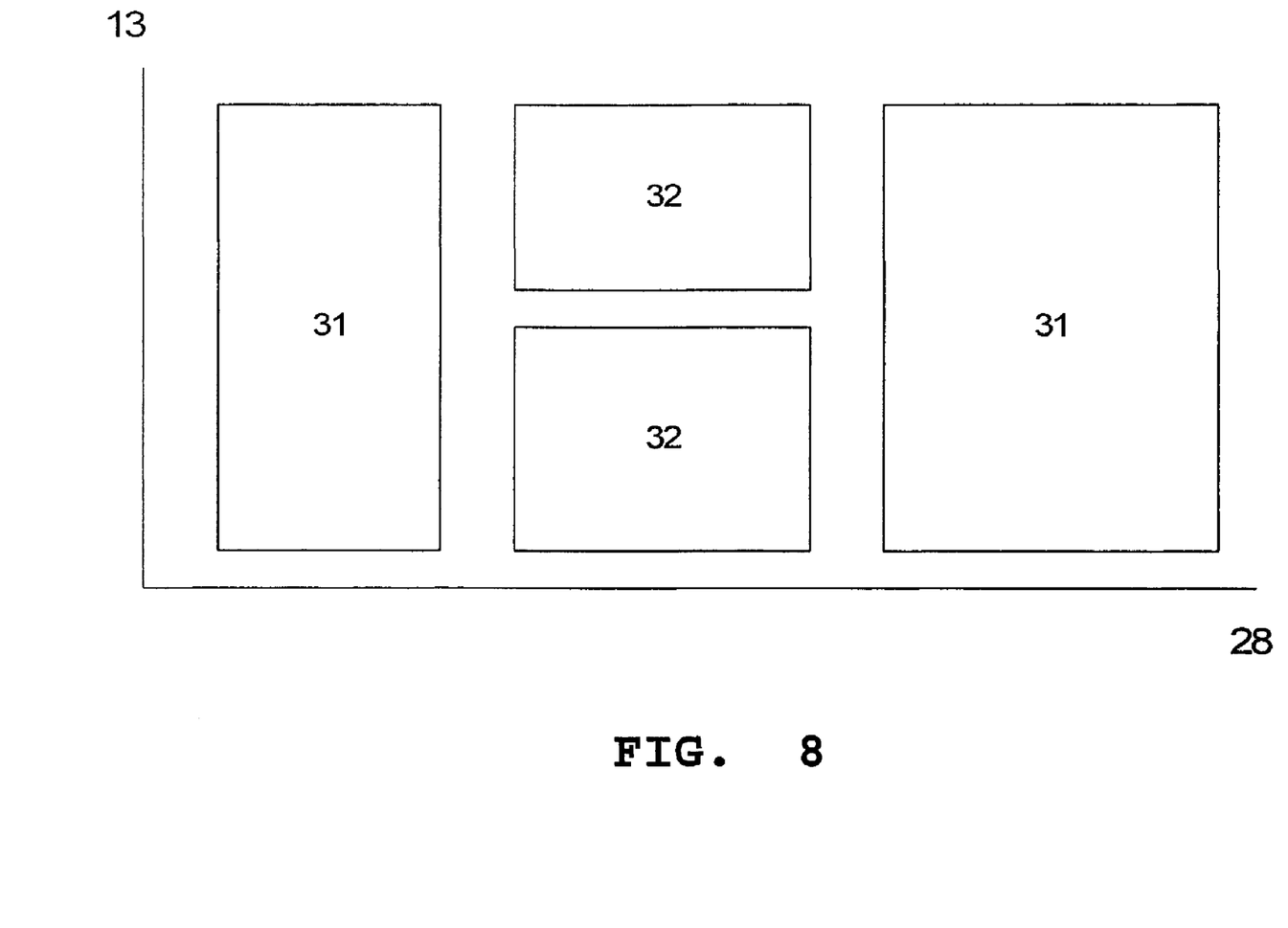
FIG. 8 shows one way to achieve compatibility in systems that utilize the bands synchronously and asynchronously.
Figure 9:
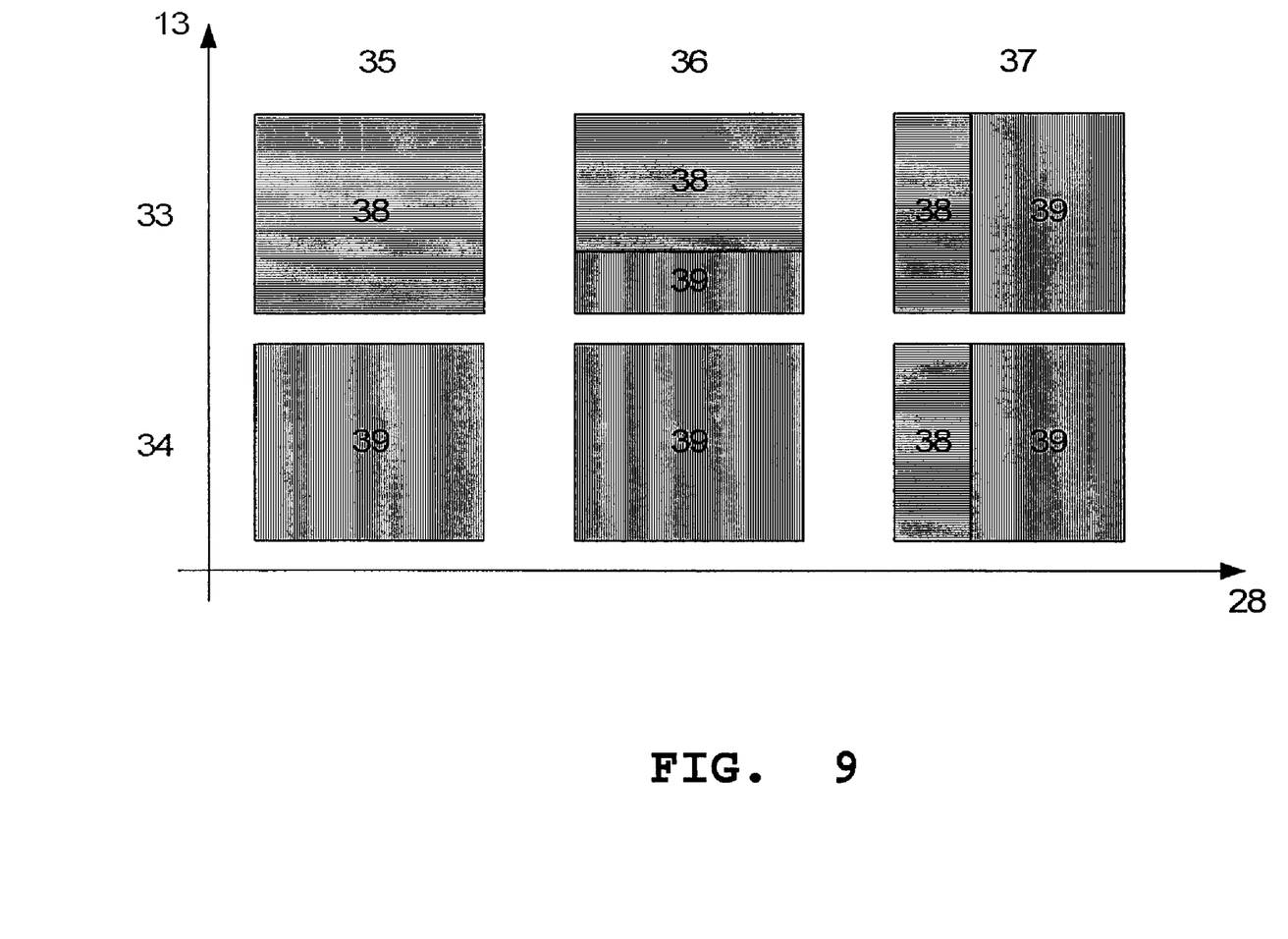
FIG. 9 shows three different ways to implement transmission of information to two users using two different bands.
Figure 11:
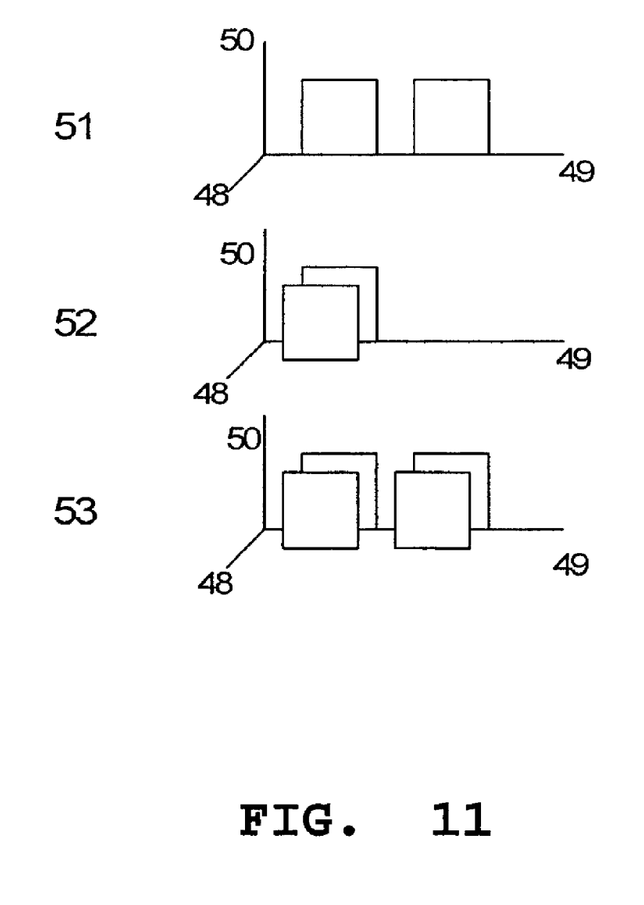
FIG. 11 shows several examples of bands and channels that can be used when MIMO processing is added to the method of the present disclosure.

Taking advantage of the fact that transmission is always simultaneous in all bands, it is possible to synchronize the system, using only one of the multiple bands of the system. As the lowest-frequency band is usually the one that attenuates least at long distances, the lower-frequency band is used in another implementation example to achieve the synchronization. On the other hand, FIG. 8 shows how to achieve compatibility in systems that use the bands synchronously, like the system that uses the method of the present disclosure, with other systems that use the bands asynchronously. In the figure is represented the use of bands with respect to a temporal axis (28) and a frequency axis (13). Initially the bandwidth is used synchronously (31), afterward there are two asynchronous bands (32) and finally the synchronous form is used again. The duration and location in time of the different periods can be communicated by means of media access assignment messages from the coordinator of the grid. In any case, it is not essential to use an entire band in order to communicate with a single user. In FIG. 9 is shown the representation in time (28) and in frequency (13) of three different cases that utilize two different bands (33) and (34). In the first case (35), each band is used to transmit data to a different user (38) and (39). In the second case (36) there are carriers of the first band (33) that are directed to one user (38) and carriers of the same band (33) that are directed to the other user (39), which also uses all the carriers of the second band (34). In the third case (37) each user (38) and (39) uses the two complete bands but in different time instants. A similar schema can be used for transmitting data from several users to the same receiver by means of OFDMA techniques. For example, several transmitters can simultaneously use different bands or groups of carriers to transmit to the same node. If a MIMO processing block (already known in the state of the art) is added to the system that is implementing the method of the present disclosure, it is possible to multiplex the bands in space as well as in frequency as has been described up to now. This can be seen in FIG. 11, where the X axis (48) corresponds to different spatial channels, the Y axis (49) corresponds to the frequency, and the Z axis (50) corresponds to the spectral density of injectable power. The same system can transmit the bands on different frequencies without using MIMO processing (51) or can transmit the bands in the same frequency band by spatially different channels and use MIMO processing to separate the information of the different bands (52). It is also possible to do both things simultaneously, as can be seen in the third case (53).

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

The invention claimed is:

1. A system for transmitting and receiving data, the system comprising:
   a physical adaptation block configured to separate data into a plurality of frequency bands, wherein each frequency band has an associated symbol time, and each associated symbol time is a whole multiple of one half of a smallest symbol time of all of the frequency bands;
   an analog front end configured to provide the data in the plurality of frequency bands; and
   a signal combiner block configured to combine the data in the plurality of frequency bands into a single signal for simultaneous transmission on a transmission medium.

2. The system of claim 1, further comprising a transmitter including i) the physical adaptation block and ii) the analog front end, wherein the transmitter is configured to simultaneously transmit the data in the plurality of frequency bands.

3. The system of claim 1, further comprising a receiver configured to simultaneously receive the data in the plurality of frequency bands.

4. The system of claim 1, wherein the transmission medium comprises an electrical grid, a coaxial cable, or a twisted-pair wire.

5. The system of claim 1, wherein each frequency band has a width of at least 20 MHz.

6. The system of claim 1, wherein the system uses direct discrete Fourier transforms (DFTs) and inverse DFTs (IDFTs) to convert the data between a time domain and a frequency domain, and wherein the DFTs and the IDFTs have a same number of points in each of the plurality of frequency bands.

7. The system of claim 1, wherein automatic gain control is applied independently to each of the plurality of frequency bands.

8. The system of claim 1, wherein the system performs synchronization using only one of the plurality of frequency bands, and wherein a frequency of the one of the plurality of frequency bands is less than frequencies of remaining ones of the plurality of frequency bands.

9. The system of claim 1, wherein the data in the plurality of frequency bands is simultaneously transmitted and received during a first period, and is not simultaneously transmitted and received during a second period.

10. A method for transmitting and receiving data, the method comprising:
    separating data into a plurality of frequency bands, wherein each frequency band has an associated symbol time, and each associated symbol time is a whole multiple of one half of a smallest symbol time of all of the frequency bands; and
    combining the data in the plurality of frequency bands into a single signal; and
    providing the data in the plurality of frequency bands in the single signal for simultaneous transmission on a transmission medium.

11. The method of claim 10, further comprising:
    simultaneously transmitting the data in the plurality of frequency bands.

12. The method of claim 10, further comprising:
    simultaneously receiving the data in the plurality of frequency bands.

13. The method of claim 10, wherein the transmission medium comprises an electrical grid, a coaxial cable, or a twisted-pair wire.

14. The method of claim 10, wherein each of the plurality of frequency bands has a width of at least 20 MHz.

15. The method of claim 10, further comprising:
    using direct discrete Fourier transforms (DFTs) and inverse DFTs (IDFTs) to convert the data between a time domain and a frequency domain, wherein the DFTs and the IDFTs have a same number of points in each of the plurality of frequency bands.

16. The method of claim 10, further comprising:
    applying automatic gain control to each of the plurality of frequency bands independently.

17. The method of claim 10, further comprising:
    performing synchronization using only one of the plurality of frequency bands, wherein a frequency of the one of the plurality of frequency bands is less than frequencies of remaining ones of the plurality of frequency bands.

18. The method of claim 10, further comprising:
    simultaneously transmitting and receiving the data in the plurality of frequency bands during a first period; and
    not simultaneously transmitting and receiving the data in the plurality of frequency bands during a second period.

* * * * *